United States Patent
Kawakami

(10) Patent No.: US 7,486,333 B2
(45) Date of Patent: Feb. 3, 2009

(54) BATTERY REMAINING AMOUNT WARNING APPARATUS

(75) Inventor: Chikuni Kawakami, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 1213 days.

(21) Appl. No.: 10/608,570

(22) Filed: Jun. 30, 2003

(65) Prior Publication Data

US 2004/0012712 A1 Jan. 22, 2004

(30) Foreign Application Priority Data

Jul. 3, 2002 (JP) ............................ 2002-194557

(51) Int. Cl.
*H04N 5/225* (2006.01)
(52) U.S. Cl. ..................................... 348/372
(58) Field of Classification Search ................. 348/372, 348/207.99; 396/279
See application file for complete search history.

(56) References Cited

U.S. PATENT DOCUMENTS

| | | | |
|---|---|---|---|
| 4,356,481 A | 10/1982 | Kuki | |
| 6,031,999 A * | 2/2000 | Ogawa | 396/303 |
| 6,339,264 B1 * | 1/2002 | Wang | 307/132 E |
| 6,434,337 B1 * | 8/2002 | Misawa | 396/279 |
| 6,850,270 B1 * | 2/2005 | Suzuki | 348/207.2 |

FOREIGN PATENT DOCUMENTS

| | | |
|---|---|---|
| JP | 55-136818 A | 10/1980 |
| JP | 63-3538 B2 | 1/1988 |
| JP | 9-130649 | 5/1997 |
| JP | 2000-056370 A | 2/2000 |

OTHER PUBLICATIONS

Japanese Office Action dated Sep. 14, 2007.

* cited by examiner

*Primary Examiner*—Tuan V Ho
(74) *Attorney, Agent, or Firm*—Sughrue Mion, PLLC

(57) ABSTRACT

It is an object of the present invention to provide a battery remaining amount warning apparatus capable of using battery power efficiently to the full and allowing the user to select its mode according to the remaining amount of the battery. The A/D converter always measures a voltage value of the battery and when the voltage value of the battery falls below a specified level due to consumption, etc., of the battery, the A/D converter applies a pulse signal to the dummy-load circuit and measures the voltage of the battery when the pulse signal is applied and the A/D converter detects a voltage drop of the battery. When a voltage drop of the battery is detected, the data LCD displays warnings about supply voltage drops corresponding to various modes such as a recording mode, playback mode, flash charge image pickup mode, etc., of the digital camera simultaneously.

9 Claims, 7 Drawing Sheets

CURRENT   CURRENT = (E − 0.6) / RESISTANCE R

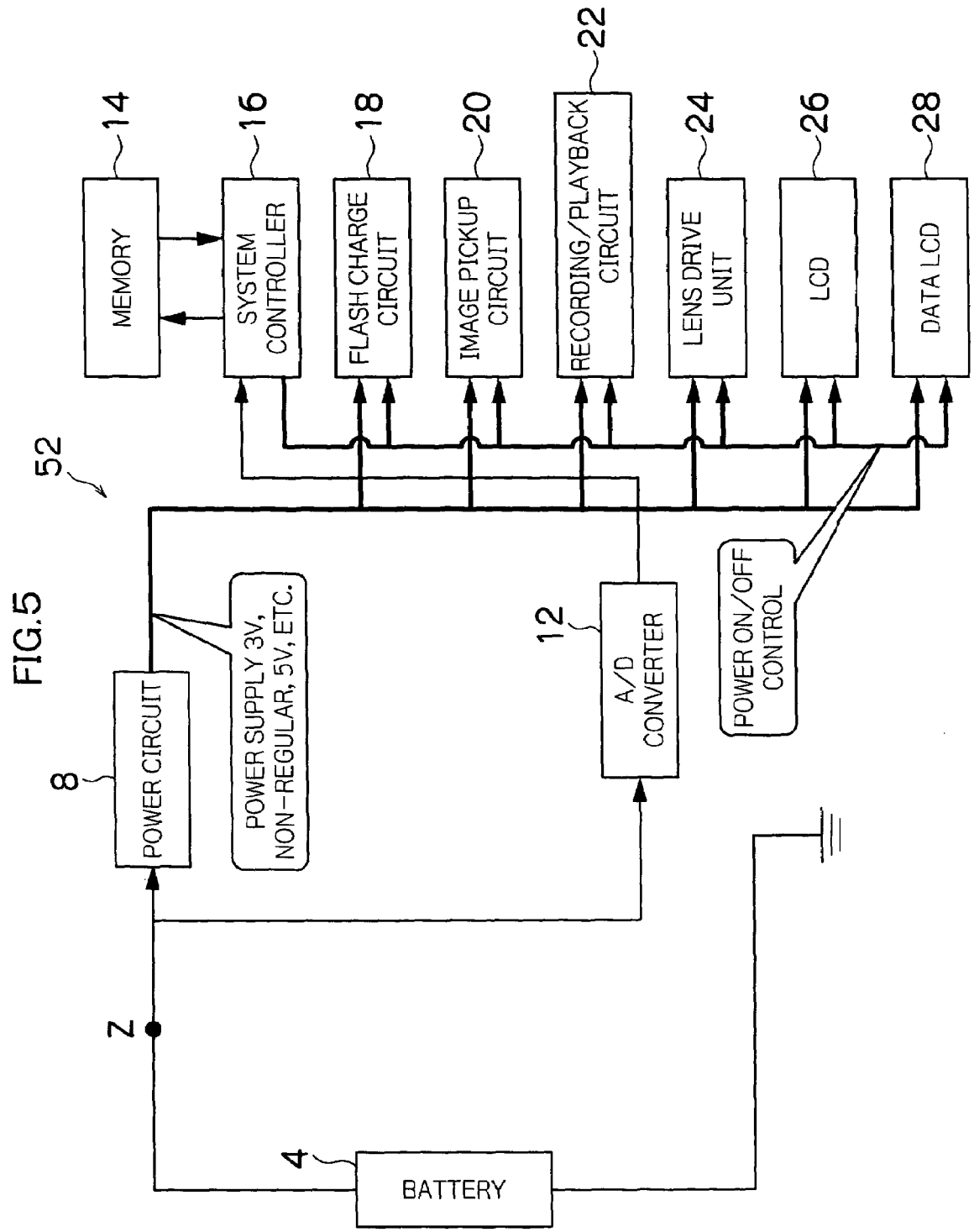

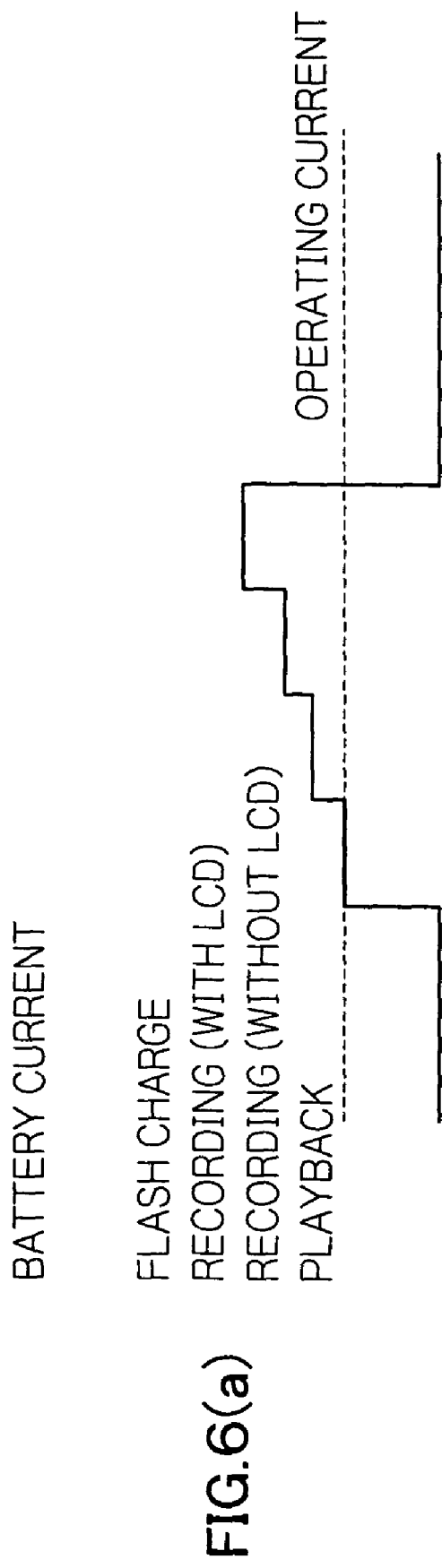
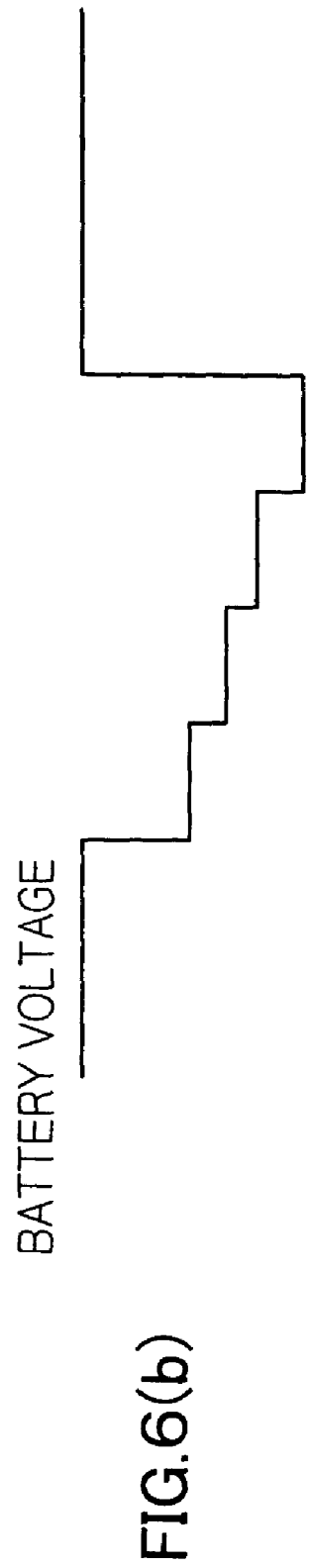
FIG.6(a)
FIG.6(b)

FIG.7(a)

LCD SCREEN

| IMAGE PICKUP WITH FLASH | *, 1, --- OR MORE |
| IMAGE PICKUP WITH LCD | *, 1, --- OR MORE |
| IMAGE PICKUP WITHOUT LCD | *, 1, --- OR MORE |
| PLAYBACK | *, 1, --- OR MORE |

LCD SCREEN

| IMAGE PICKUP WITH FLASH | * |
| IMAGE PICKUP WITH LCD | ○ |
| IMAGE PICKUP WITHOUT LCD | ○ |
| PLAYBACK | ○ |

*···NOT POSSIBLE   ○··· POSSIBLE

FIG.8

$$\begin{pmatrix} \text{NOT POSSIBLE} \longrightarrow \text{ON} \\ \text{POSSIBLE} \longrightarrow \text{OFF} \end{pmatrix}$$

|  | LED DISPLAY |
|---|---|
| IMAGE PICKUP WITH FLASH | ○ |
| IMAGE PICKUP WITH LCD | ○ |
| IMAGE PICKUP WITHOUT LCD | ○ |
| PLAYBACK | ○ |

BATTERY REMAINING AMOUNT WARNING APPARATUS

BACKGROUND OF THE INVENTION

1. Field of the Invention

The present invention relates to a battery remaining amount warning apparatus used for a digital camera.

2. Description of the Related Art

As a conventional method for warning about a remaining amount of a battery of an electronic device, it is a general practice that a battery voltage is measured and a warning about the remaining amount is issued when the battery voltage falls below a specified value or DC resistance of the battery increases.

There are a variety of types of battery such as alkaline cell, nickel hydrogen cell, nickel cadmium cell, and there are also a variety of battery characteristics. However, with a monitoring of the battery voltage alone, depending on the type of the battery, the battery power may not be used to the full because a considerable amount of the battery can still be used after the warning is given about the insufficient remaining amount of the battery.

Furthermore, when the remaining amount of the battery is predicted from the battery voltage, the voltage varies depending on the type of the battery and when the battery voltage is low because of the nature of the type of the battery, a warning is issued earlier. For example, a warning is issued with an alkaline cell at 1.5 V/cell and with a NiCd cell at 1.2 V/cell.

To solve this problem, there is also a proposal of a method for measuring a battery voltage by providing a dummy-load circuit (Japanese Patent Publication No. 63-3538). However, this method increases unnecessary power consumption.

There is also a proposal of a method for deciding whether a camera operates normally or not based on a boosting operation of a booster circuit when a flash capacitor is charged (Japanese Patent Application Publication No. 2000-56370), but when no flash is used or can be used, there is no way to decide it.

Digital cameras are becoming widespread today. Their batteries are however likely to run down quickly when a liquid crystal monitor or drive system is used frequently.

In order to use battery power to the full and avoid the battery from running down while a digital camera is operating, a conventional camera shows a remaining amount of the battery and gives a warning when the camera is continuously used in a mode under operation such as a recording mode, playback mode and flash charge mode.

However, since a digital camera has various modes using different supply currents such as playback, recording and flash charge, etc., there are various cases, for example, flash charge is not possible while recording without flash is possible or recording is not possible while playback is possible. In such cases, it would be convenient if the user can select a mode according to the remaining amount of the battery and this will prevent the battery from running down during operation.

SUMMARY OF THE INVENTION

It is an object of the present invention to provide a battery remaining amount warning apparatus capable of using battery power efficiently to the full and allowing the user to select its mode according to the remaining amount of the battery.

A first aspect of the present invention is a battery remaining amount warning apparatus that gives a warning about a voltage drop of a battery in a digital camera, including a measuring device which measures DC resistance or voltage of the battery, a detecting device which detects a voltage drop of the battery from the DC resistance value or voltage value measured by the measuring device, and a supply voltage warning device which, when the detecting device detects a voltage drop of the battery, simultaneously displays warnings about drops in the supply voltage according to various modes such as a recoding mode, playback mode and flash charge image pickup mode of the digital camera.

According to the invention according to the first aspect, when the detecting device detects a voltage drop of the battery from the DC resistance value or voltage value measured by the measuring device, the supply voltage warning device displays warnings about a drop of the supply voltage according to various modes such as a recoding mode, playback mode and flash charge image pickup mode of the digital camera simultaneously. That is, a warning about whether the supply voltage of the battery is enough or not to execute each mode is displayed. "Displaying simultaneously" means displaying various warnings about how long the battery will last all together assuming that various modes are executed when the digital camera is started in a specific mode or when started without specifying any mode.

A second aspect of the present invention comprises the battery remaining amount warning apparatus according to the first aspect, wherein simultaneously displaying warnings about drops in the supply voltage according to various modes such as the recoding mode, playback mode and flash charge image pickup mode means displaying simultaneously the number of recordable images, the number of reproducible images or times of reproducible images, or the number of images that can be taken in flash charge.

According to the invention according to the second aspect, simultaneously displaying warnings about supply voltage drops according to the various modes means displaying simultaneously the number of recordable images, or the number of reproducible images or times of reproducible images, or the number of images that can be taken with flash charge, and therefore the user can keep track of the number of executable images or time in the various modes such as recoding, playback and flash charge image pickup simultaneously.

The invention according to a third aspect is a battery remaining amount warning apparatus that gives a warning about a voltage drop of a battery in a digital camera, including a measuring device which measures DC resistance or voltage of a battery, a detecting device which detects a voltage drop of the battery from the DC resistance value or voltage value measured by the measuring device, and a supply voltage warning device which, when the detecting device detects a voltage drop of the battery, calculates the number of images that can be taken in a recording mode of the digital camera from the measured DC resistance value or voltage value through calculations from the DC resistance value or voltage value, or through a table of DC resistance values or voltage values and the number of recordable images, and displays these values.

According to the invention according to the third aspect, when the detecting device detects a voltage drop of the battery from the DC resistance value or voltage value measured by the measuring device, the supply voltage warning device calculates the number of images that can be taken in the recording mode of the digital camera from the measured DC resistance value or voltage value through calculations from the DC resistance value or voltage value, or through a table of DC resistance values or voltage values and the number of recordable images, and displays these values. The calculation formula for calculating the number of images that can be taken in the recording mode of the digital camera from the DC resistance values or voltage values measured by the measuring device is predetermined. The table for calculating the number of images that can be taken in the recording mode of the digital camera from the DC resistance values or voltage values measured by the measuring device is also predetermined.

The invention according to the first aspect allows the user to distinguish an executable mode based on the current remaining amount of the battery when the battery is running down and thereby select the executable mode.

The invention according to the second aspect allows the user to keep track of an executable mode with a specific number of images or time simultaneously based on the current remaining amount of the battery and thereby select the executable mode and more specifically know to what extent the mode is executable, which allows the user to operate within the range. Furthermore, the battery is not exhausted within that range, and therefore the user can execute the mode without anxiety.

The invention according to the third aspect allows the user to know how many images can be taken in the recording mode further based on the current remaining amount of the battery and thereby take images within the range of the number of images. Furthermore, the battery is not exhausted within that range, and therefore the user can execute the mode without anxiety.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 5 is a block diagram showing a configuration of a digital camera according to a second embodiment;

FIG. 6(a) illustrates a change state of a battery current in various modes, and FIG. 6(b) illustrates a change state of a battery voltage corresponding to FIG. 6(a);

FIG. 7(a) is a data LCD screen showing the number of images that can be taken in various modes, and FIG. 7(b) is a data LCD screen showing whether each operation is possible or not in each mode; and FIG. 8 shows a case where an LED shows whether each operation is possible or not in each mode.

DETAILED DESCRIPTION OF THE PREFERRED EMBODIMENTS

With reference now to the attached drawings, embodiments of the battery remaining amount warning apparatus according to the present invention will be explained below. The battery remaining amount warning apparatus built in the digital camera will be explained, which will be presented as a first embodiment and second embodiment.

Embodiment 1

Figure 1:
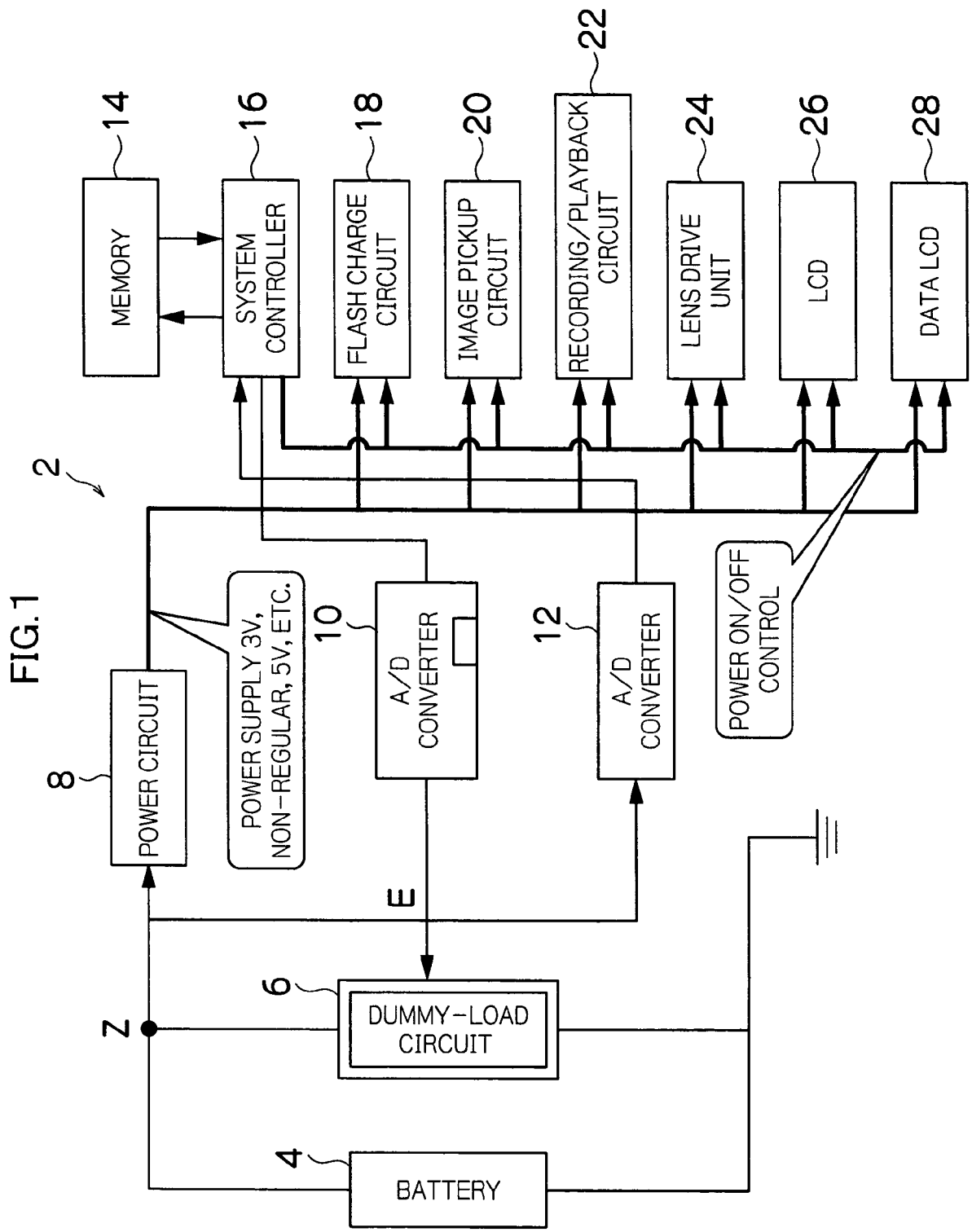
FIG. 1 is a block diagram showing a configuration of a digital camera according to a first embodiment.

First, a first embodiment will be explained. FIG. 1 is a block diagram showing a configuration of a digital camera 2 according to the first embodiment.

The digital camera 2 includes a flash charge circuit 18, an image pickup circuit 20, a recording/playback circuit 22, a lens drive unit 24, an LCD 26, a data LCD 28 and a system controller 16 that sends control signals to these circuits, etc. The system controller 16 exchanges data with a memory 14. A power circuit 8 is connected to the circuits 18 to 28 and power is supplied from the power circuit 8 to the circuits 18 to 28.

A battery 4 is connected in parallel to a dummy-load circuit 6 and one end of the connection is grounded and the other end Z is connected to the power circuit 8. An A/D converter 10 is connected to the system controller 16 and a pulse signal is applied from the A/D converter 10 to the dummy-load circuit 6 under the instruction of the system controller 16. The connection point Z is also connected to an A/D converter 12 and the A/D converter 12 is connected to the system controller 16. A voltage value at the connection point Z and a voltage drop value when a pulse signal is applied to the dummy-load circuit 6 are input to the A/D converter 12 and the A/D-converted voltage value and voltage drop value are input to the system controller 16. The system controller 16 sends a control signal for the transmission of a pulse signal to be applied to the dummy-load circuit 6 to the A/D converter 10 based on the input voltage value and voltage drop value.

Figure 2:
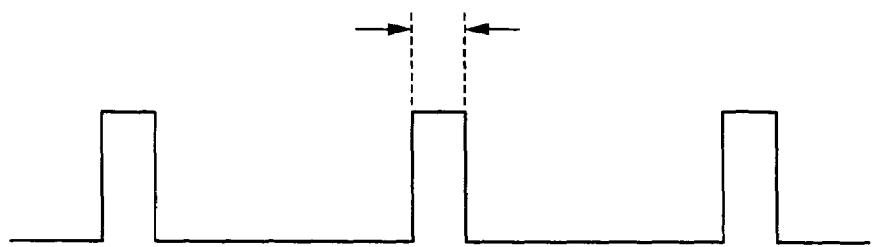
FIG. 2 is a schematic view of a pulse signal applied to a dummy-load circuit.
Figure 3:
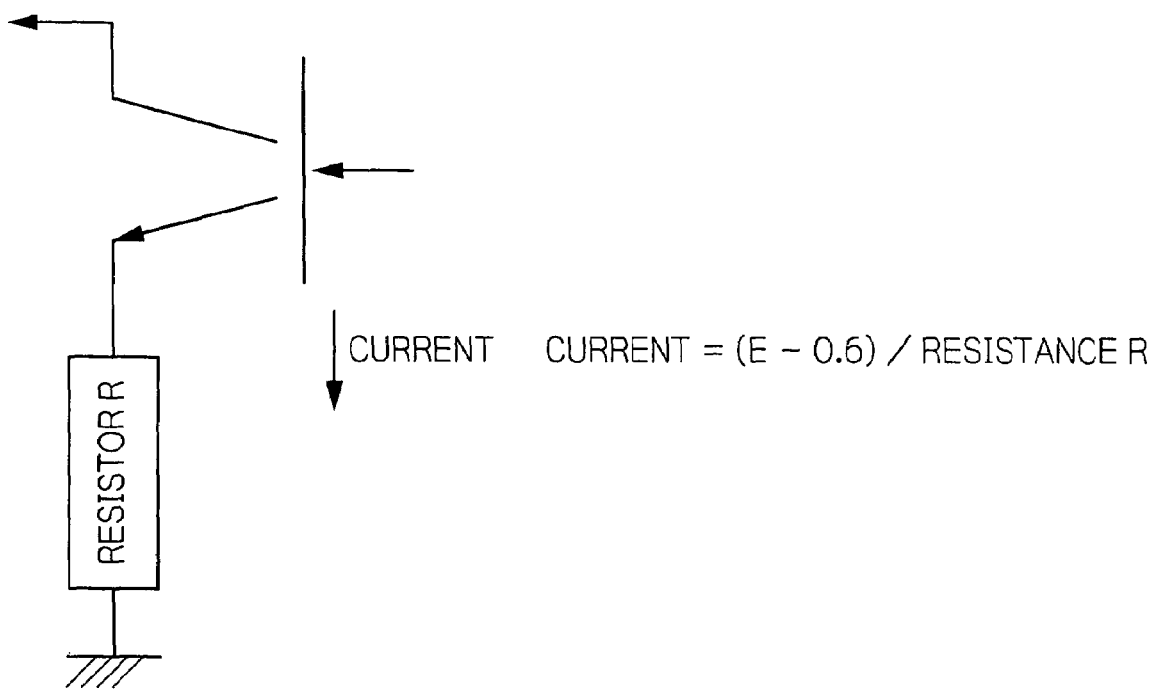
FIG. 3 is a schematic view of the dummy-load circuit.

FIG. 2 is a schematic view of the pulse signal applied to the dummy-load circuit 6. The pulse signal with a control voltage E is applied to the dummy-load circuit 6. The dummy-load circuit 6 has a configuration shown in FIG. 3 and the pulse signal applied from the A/D converter 10 corresponds to a signal applied from the base of an NPN type transistor. Because a resistance R is connected to the emitter, the current of {voltage (E−0.6)/resistance R} flows through the resistor R. That is, the current of {voltage (E−0.6)/resistance R} flows through the dummy-load circuit 6.

Figure 4:
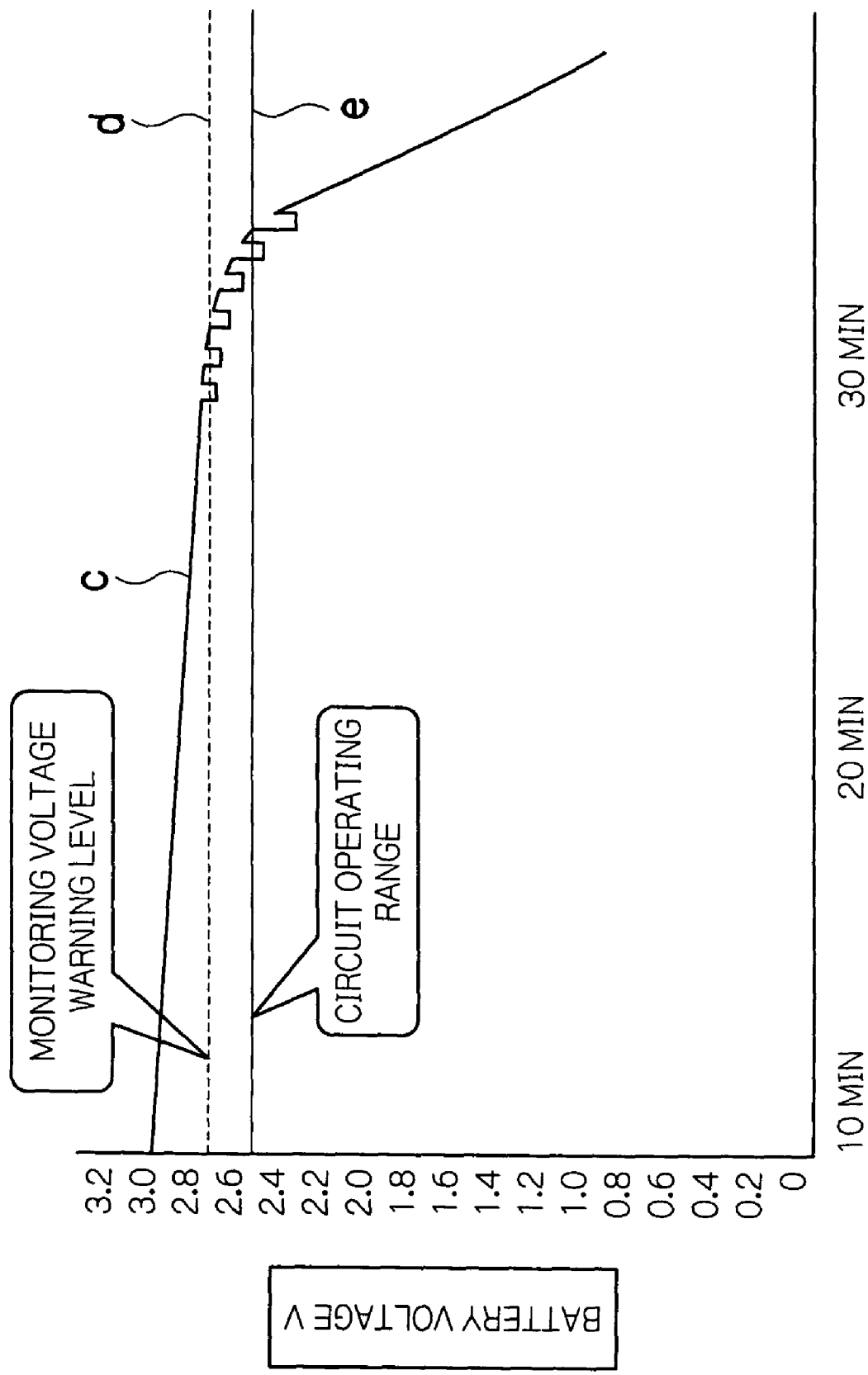
FIG. 4 is a graph showing a voltage value c of a battery at connection point Z.

FIG. 4 is a graph showing a voltage value c of the battery 4 at connection point Z. As described above, the voltage value c is input from the A/D converter 12 to the system controller 16, and therefore it is always measured. According to FIG. 4, the initial voltage value 3.0 V decreases gradually. By the way, the voltage value of the power circuit 8 is 3.0 V. A warning level d of monitoring voltage is set to 2.7 V and when the voltage value c falls below 2.7 V, a pulse signal is applied to the dummy-load circuit 6 from the A/D converter 10.

When the pulse signal is applied, a maximum load is applied to the battery 4 and the moment it is applied, the voltage of the battery drops. Past 30 minutes, the battery voltage value starts to drop drastically, causing the internal resistance of the battery 4 to increase. Therefore, when the pulse signal is applied, the drop of the battery voltage also increases gradually. The voltage drop value is also input from the A/D converter 12 to the system controller 16 and therefore it is measured. The power circuit 8 operates normally when the battery voltage is 2.5 V or higher as shown by e in FIG. 4. If the voltage value that drops when the pulse signal is applied falls below 2.5 V, the system controller 16 issues a control signal to the data LCD 28 and a warning about the remaining amount of the battery is displayed on the data LCD 28.

The magnitude of a drop of the battery voltage varies depending on the mode. FIG. 6(a) illustrates a change state of a battery current in various modes and FIG. 6(b) illustrates a change state of a battery voltage corresponding to FIG. 6(a).

In a playback mode, the battery current is not so high. During recording when a liquid crystal display (LCD) is not used, the battery current increases a little and during recording when the LCD is used, the battery current increases. The battery current increases considerably in a flash charge mode. The battery voltage changes in response to the battery current. That is, the battery voltage decreases a little in the playback mode. During recording when the liquid crystal display (LCD) is not used, the battery voltage further decreases and during recording when the LCD is used, the battery voltage decreases more. During flash charge, the battery voltage decreases considerably. Therefore, the operable mode varies depending on the remaining amount of the battery. For example, when the remaining amount of the battery diminishes, it is possible to perform recording without using the LCD but not possible to perform flash charge.

Then, warning modes will be explained.

If the voltage value that drops when the pulse signal is applied falls below 2.5 V, the system controller 16 issues a control signal to the data LCD 28. The data LCD 28 displays warnings about drops in the supply voltage corresponding to various modes such as a recording mode, playback mode and flash charge image pickup mode of the digital camera 2 simultaneously.

FIG. 7(a) is a data LCD screen showing the number of images that can be taken in various modes and FIG. 7(b) is a data LCD screen showing whether each operation is possible or not in each mode.

As shown in FIG. 7(a), the data LCD 28 displays the number of images that can be taken with flash image pickup, the number of images that can be taken when the LCD is used, the number of images that can be taken when the LCD is not used and the number of reproducible images simultaneously. The calculation formula for calculating the number of images that can be taken in each mode based on the measured voltage value is provided beforehand. It is also possible to prepare a table of measured voltage values and the number of images that can be taken in each mode instead of the calculation formula.

The values can also be displayed in the mode shown in FIG. 7(b). The data LCD 28 shows whether images can be taken or not during flash image pickup, when the LCD is used, when the LCD is not used or whether playback is possible or not simultaneously.

Moreover, though not shown, it is also possible to display an operable time in each mode. That is, allowable time for image pickup with flash image pickup or allowable time for image pickup when the LCD is used, etc. In this case, the operable time in each mode can also be calculated from measured voltage values or a table.

These warnings are shown if the power of the digital camera 2 is ON irrespective of the current operating mode.

Therefore, the operator of the digital camera 2 can recognize that the remaining amount of the battery voltage is small in any mode, know the remaining number of images (or minutes and seconds) that can be recorded (reproduced) according to the mode used, and can thereby select an operable mode within the range of the remaining amount of the battery voltage. This reduces to a minimum the possibility of the battery running down during operation in the selected mode and prevents unexpected stop of operation during operation. Furthermore, since this embodiment allows a sufficient amount of battery power to be used before a warning about the battery remaining amount is issued, there will be no such case that several tens of images can still be taken after a warning about the remaining amount of the battery is issued. Moreover, the current flows into the dummy-load circuit 6 after the battery voltage falls below the warning level, which reduces power consumption.

Furthermore, it is also possible to express a warning about whether an operation is possible or not by means of ON or OFF of an LED instead of providing a data LCD.

FIG. 8 shows a case where an LED shows whether each operation is possible or not in each mode. For example, when flash image pickup operation is not possible, the corresponding LED turns ON and when possible, the corresponding LED remains OFF, and LEDs operating in the same way are also provided in respective cases of image pickup operation with the LCD, without the LCD or playback. In these cases, the system controller 16 also transmits operation control signals to the LEDs.

Embodiment 2

A second embodiment will be explained. FIG. 5 is a block diagram showing a configuration of a digital camera 52 according to the second embodiment.

The digital camera 52 includes a flash charge circuit 18, an image pickup circuit 20, a recording/playback circuit 22, a lens drive unit 24, an LCD 26, a data LCD 28 and a system controller 16 that sends control signals to these circuits, etc. The system controller 16 exchanges data with a memory 14. A power circuit 8 is connected to the circuits 18 to 28 and power is supplied from the power circuit 8 to the circuits 18 to 28.

One end of the battery 4 is connected to the power circuit 8 and the other end is grounded. An A/D converter 12 is connected at a connection point Z on the side of the battery 4 toward the power circuit 8 and the A/D converter 12 is connected to the system controller 16. A voltage value and voltage drop value at the connection point Z are input to the A/D converter 12 and the A/D-converted voltage value and voltage drop value are input to the system controller 16. The system controller 16 sends a control signal for displaying an appropriate message about the remaining amount of the battery to the data LCD 28 based on the input voltage value and voltage drop value.

The mode of displaying warnings about the remaining amount of the battery is the same as that in the first embodiment and therefore explanations thereof will be omitted.

Thus, in the second embodiment, the operator of the digital camera 52 can also recognize that the remaining amount of the battery voltage is small in any mode, know the remaining number of images (or minutes and seconds) that can be recorded (reproduced) according to the mode used, and can thereby select an operable mode within the range of the remaining amount of the battery voltage. This reduces to a minimum the possibility of the battery running down during operation in the selected mode and prevents unexpected stop during operation.

The first embodiment and second embodiment have described the case where the battery voltage value is monitored both when a pulse signal is applied and when monitoring is always performed, and it is also possible to adopt a method of monitoring DC resistance of the battery in both cases.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A battery remaining amount warning apparatus that gives a warning about a voltage drop of a battery in a digital camera, comprising:
a measuring device which measures DC resistance or voltage of the battery;
a detecting device which detects a voltage drop of the battery from the DC resistance value or voltage value measured by the measuring device; and
a supply voltage warning device which, when the detecting device detects a voltage drop of the battery, simultaneously displays warnings about drops in the supply voltage according to various modes including a recording mode, playback mode and flash charge image pickup mode of the digital camera.

2. The battery remaining amount warning apparatus according to claim 1, wherein simultaneously displaying warnings about drops in the supply voltage according to various modes such as the recording mode, playback mode and flash charge image pickup mode means displaying simultaneously the number of recordable images, the number of reproducible images or times of reproducible images, or the number of images that can be taken in flash charge.

3. A battery remaining amount warning apparatus that gives a warning about a voltage drop of a battery in a digital camera, comprising:
a measuring device which measures DC resistance or voltage of the battery;
a detecting device which detects a voltage drop of the battery from the DC resistance value or voltage value measured by the measuring device; and
a supply voltage warning device which, when the detecting device detects a voltage drop of the battery, calculates a number of images that can be taken in a recording mode of the digital camera from the measured DC resistance value or voltage value through calculations from the DC resistance value or voltage value, or through a table of DC resistance values or voltage values and the number of recordable images, and displaying these values.

4. The battery remaining amount warning apparatus according to claim 1, wherein the various modes include at least, a recoding mode, a playback mode, and a flash charge image pickup mode, and wherein the warnings of each mode are displayed simultaneously based on a voltage condition of the camera.

5. The battery remaining amount warning apparatus according to claim 1, wherein in simultaneously displaying warnings, for a playback mode, the warning includes information on drops in the supply voltage according to the playback mode comprises displaying the number of reproducible images which can be reproduced based on the voltage drop.

6. The battery remaining amount warning apparatus according to claim 5, wherein when the detecting device detects a voltage drop of the battery, the supply voltage warning device calculates a number of images that can be reproduced in the playback mode of the digital camera from the measured DC resistance value or voltage value through calculations from the DC resistance value or voltage value, or through a table of DC resistance values or voltage values and the number of reproducible images, and displaying these values.

7. The battery remaining amount warning apparatus according to claim 1, wherein in simultaneously displaying warnings, for the flash charge image pickup mode, the warning information includes information about drops in the supply voltage according to the flash charge image pickup mode comprises displaying the number of the number of images that can be taken in flash charge based on the voltage drop.

8. The battery remaining amount warning apparatus according to claim 7, wherein when the detecting device detects a voltage drop of the battery, the supply voltage warning device calculates a number of images that can be taken in flash charge in the flash charge image pickup mode of the digital camera from the measured DC resistance value or voltage value through calculations from the DC resistance value or voltage value, or through a table of DC resistance values or voltage values and the number of images that can be taken in flash charge, and displaying these values.

9. The battery remaining amount warning apparatus according to claim 1, wherein when the detecting device detects a voltage drop of the battery, the supply voltage warning device calculates the allowable time of operation of each mode of the various modes from the measured DC resistance value or voltage value through calculations from the DC resistance value or voltage value, or through a table of DC resistance values or voltage values and the allowable time of operation of each mode of the plurality of modes, and displaying these values.

* * * * *